US011390215B2

(12) United States Patent
Lerzer et al.

(10) Patent No.: US 11,390,215 B2
(45) Date of Patent: Jul. 19, 2022

(54) ASSISTANCE SYSTEM FOR A VEHICLE

(71) Applicant: AUDI AG, Ingolstadt (DE)

(72) Inventors: Jürgen Lerzer, Neumarkt (DE);
Matthijs Paffen, Karlskron (DE); Hans Georg Gruber, Ingolstadt (DE);
Francesco Bacco, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 117 days.

(21) Appl. No.: 16/637,004

(22) PCT Filed: Sep. 7, 2018

(86) PCT No.: PCT/EP2018/074173
§ 371 (c)(1),
(2) Date: Feb. 6, 2020

(87) PCT Pub. No.: WO2019/048623
PCT Pub. Date: Mar. 14, 2019

(65) Prior Publication Data
US 2020/0167969 A1    May 28, 2020

(30) Foreign Application Priority Data

Sep. 8, 2017 (DE) .......................... 102017215901.4

(51) Int. Cl.
*B60R 1/00* (2022.01)
*H04N 21/485* (2011.01)
(Continued)

(52) U.S. Cl.
CPC ............. *B60R 1/00* (2013.01); *H04N 21/258* (2013.01); *H04N 21/485* (2013.01); *B60K 35/00* (2013.01); *B60K 2370/143* (2019.05);
*B60K 2370/146* (2019.05); *B60K 2370/148* (2019.05); *B60K 2370/152* (2019.05); *B60K 2370/785* (2019.05);
(Continued)

(58) Field of Classification Search
CPC ................ B60R 1/00; B60R 2300/205; B60R 2300/305; B60Q 9/00; B60Q 9/008; H04N 21/258; H04N 21/485; H04N 21/4858; G06F 3/03; G06F 3/0354; G06F 3/042; G06F 3/0482; G06F 3/0484
See application file for complete search history.

(56) References Cited

U.S. PATENT DOCUMENTS

| 10,479,274 B2 * | 11/2019 | Park ....................... B60Q 1/085 |
| 2008/0211779 A1 * | 9/2008 | Pryor .................. G06F 3/04847 345/173 |

(Continued)

FOREIGN PATENT DOCUMENTS

| DE | 102015101358 A1 | 8/2015 |
| DE | 102015009849 A1 | 2/2017 |

(Continued)

OTHER PUBLICATIONS

NPL_search (Aug. 20, 2021).*
(Continued)

*Primary Examiner* — Van T Trieu
(74) *Attorney, Agent, or Firm* — Maier & Maier, PLLC

(57) ABSTRACT

A vehicle assistance system with at least one outside camera, a control unit, at least one display unit, an occupant identification unit, and a human machine interface (Human Machine Interface, HMI).

9 Claims, 1 Drawing Sheet

(51) Int. Cl.
*H04N 21/258* (2011.01)
*B60K 35/00* (2006.01)
*G06T 11/00* (2006.01)

(52) U.S. Cl.
CPC ..... *B60R 2300/105* (2013.01); *B60R 2300/20* (2013.01); *B60R 2300/307* (2013.01); *B60R 2300/804* (2013.01); *B60R 2300/8033* (2013.01); *G06T 11/00* (2013.01)

(56) References Cited

U.S. PATENT DOCUMENTS

2013/0158778 A1   6/2013   Tengler et al.
2018/0270542 A1*  9/2018   Ramalingam ...... G02B 27/0101

FOREIGN PATENT DOCUMENTS

EP    1826648 B1      9/2011
WO    2017/095852 A1  6/2017

OTHER PUBLICATIONS

International Search Report with English translation and Written Opinion with Machine translation dated Jan. 2, 2019 in corresponding International Application No. PCT/EP2018/074173; 27 pages.
International Provisional Report on Patentability dated Dec. 9, 2019 in corresponding International Application No. PCT/EP2018/074173; 14 pages; Machine translation attached.

* cited by examiner

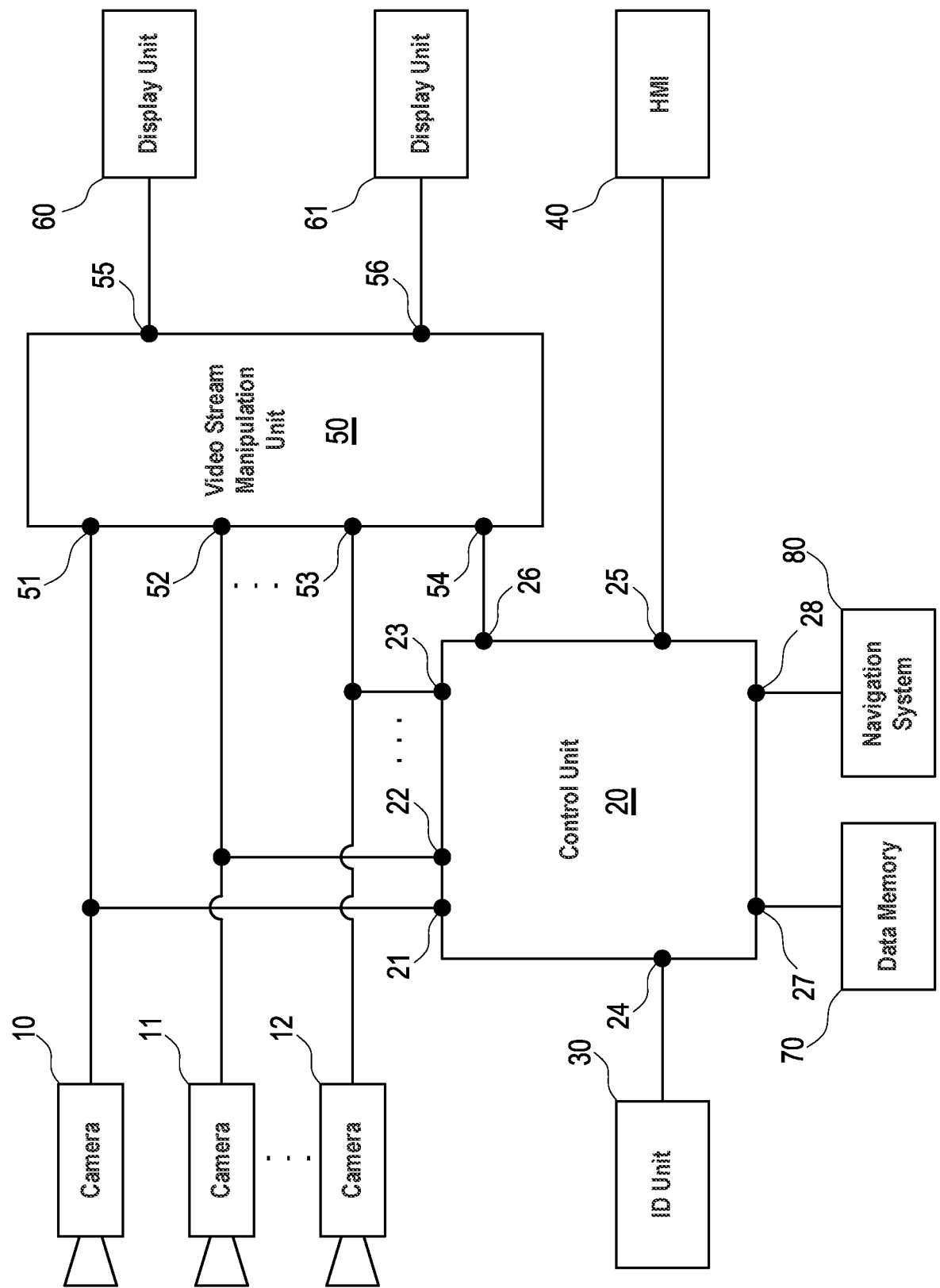

ASSISTANCE SYSTEM FOR A VEHICLE

FIELD

The invention relates to a vehicle assistance system with at least an outside camera, a control unit, at least one display unit, an occupant identification unit and a human machine interface (Human Machine Interface, HMI). Furthermore, the invention relates to a corresponding method.

BACKGROUND

Current assistance systems for a vehicle are mainly designed as vehicle assistance systems and assist the driver in the steering of the vehicle. These assistance systems share the fact that they become useful to the driver while the vehicle is moving.

For example, parking aids are known, wherein, by means of a rearward-directed outside camera, a video stream is generated, which continuously reproduces the surrounding area behind the vehicle. This video stream is made visible on a monitor arranged in the field of view of the driver, which can be observed conveniently, i.e., without turning the head. In this manner, the driver can simply and reliably detect the position and direction of the vehicle, for example, relative to another vehicle parking behind the parking spot. Such parking aids can also comprise a distance sensor and/or a steering angle sensor, the data of which is overlaid in the video stream in the form of an optical or acoustic warning and/or of a travel path calculated beforehand based on the sensor data.

An additional example of such vehicle assistance system consists of braking assistants which, during the travel of a vehicle, reduce the risk of collision with vehicles driving in front. Such a braking assistant detects, by means of a distance sensor and/or of a forward-directed outside camera, vehicles driving in front, additional traffic participants such as bicyclists or pedestrians, as well as other obstacles, and brakes the vehicle automatically and in a commensurate manner when the driver does not react or reacts too late, for example, due to inattentiveness.

In the case of vehicle assistance systems with one or more outside cameras, in particular in the case of the above-mentioned braking assistants, proper functioning must be ensured even in the case of inclement weather conditions.

Thus, EP 1 826 648 B1 discloses an imaging device for acquiring a surrounding area of a vehicle with an outside camera, a control unit and a display unit. The imaging device is configured to precisely detect fog or rain in the surrounding area of the vehicle as well as rain drops or dirt on lenses or glass panes in the optical axis of the outside camera by means of a contour comparison between stored shape information and optically acquired shapes of certain objects acquired in the surrounding area and compensate for them.

Alternatively, from DE 10 2015 009 849 A1, a radar system for a vehicle is known, with an outside camera, a radar unit, a sensor unit, a control unit and a display unit. The radar system is used for detecting and displaying additional vehicles acquired by means of the radar unit, which are driving in front in the lane of the vehicle recorded by the outside camera or are crossing the lane of the vehicle. Based on the weather conditions acquired by the sensor unit, the snow flakes, hail stones or rain drops which interfere with the radar acquisition are excluded from the vehicle detection and display.

Conventional navigation systems are also commonly used driver assistance systems. They assist the driver of a vehicle in selecting and following an optimal travel route to a certain travel destination. In a navigation system, the current position and direction of the vehicle are determined in real time by satellites (for example, GPS), and in the case of transient shading thereof, for example, in tunnels, also by means of the steering angle and speed of the vehicle.

From digital road maps stored in the navigation system, a relevant map section matching the vehicle position and direction is continuously determined and displayed on a monitor in the field of view of the driver. In the map section, vehicle position and direction as well as the optimal travel route are graphically overlaid and usually supplemented by concrete direction instructions to the driver as well as by additional travel information such as remaining distance or time to the travel destination. In this manner, added value is generated for the driver, and the cumbersome handling of usually complicatedly folded paper road maps while driving can be dispensed with.

DE 10 2015 101 358 A1 discloses an additional driver assistance system which is used for acquiring and guiding the attention of the driver. During travel, the driver's attention on a point in the surrounding area of the vehicle is determined based on temporally sequential viewing vectors of the driver, which are acquired by means of a human machine interface. When the driver's attention deviates from a relevant point, for example a traffic sign, in the surrounding area which is transmitted into the vehicle, for example by means of a navigation device, the driver of the vehicle is warned and requested to guide his/her attention to the desired point.

However, current developments are progressively equipping vehicles with increasingly farther reaching self-driving functionality, in order to increase general safety in road traffic and to relieve pressure on the driver. For example, vehicles which automatically back into a parking spot without intervention of the driver are already known.

Even more advanced is the development of vehicles which support a highly automated self-driving functionality (stage 3) or a fully automated self-driving functionality (stage 4). The latter—except for travel destination input—make do without manual intervention of a driver during travel.

In increasingly self-driving vehicles, the driver has to pay less and less or finally no attention to the traffic events in the surrounding area of the vehicle. Accordingly, in the future, the driver will increasingly be like a simple occupant of the vehicle and in the end substantially equivalent to an occupant. Accordingly, the driver's possibilities of keeping an eye out for points of interest along the travel route during travel are increased, for example, in order to temporarily interrupt travel for a visit.

However, an occupant of a vehicle would naturally easily miss many of points of interest such as, for example, buildings or beautiful landscapes along the travel route, since his/her spatial range of attention is physiologically limited to a small section of his/her field of view. In addition, the points of interest along a travel route are naturally exceedingly numerous and varied. Therefore, the number and variety of points of interest can exceed the attention of the occupant.

SUMMARY

Therefore, the aim of the invention is to provide a novel assistance system for a vehicle, which guides the attention of a specific occupant of the vehicle individually and depending on interest.

One subject matter of the present invention is a learning assistance system ("In-Vehicle Digital Scout") for a vehicle, wherein a statement of a specific occupant of the vehicle is interpreted as an expression of interest in an entity in a surrounding area of the vehicle and is stored. In this manner, the assistance system is capable of learning over time the interests of the specific occupant in persons, objects, landscapes and/or traffic situations, and of guiding the attention of the specific occupant to entities of interest to him/her.

The assistance system according to the invention comprises at least one outside camera. The outside camera generates a video stream which continuously reproduces a surrounding area of the vehicle.

Furthermore, the assistance system comprises a control unit connected to the outside camera. The control unit is configured to analyze the video stream and to detect entities such as persons, objects, landscapes and/or traffic situations in the video stream. In addition, it generates marker information corresponding to individual images and/or image sequences of the video stream and/or to the entities detected in the video stream. Depending on the application case, a preprocessing ("Pre-Processing") can precede the analysis of the video stream.

The assistance system moreover comprises a display unit connected to the control unit, by means of which the marker information generated by the control unit is graphically represented.

According to the invention, the assistance system comprises a human machine interface (Human Machine Interface, HMI) connected to the control unit, by means of which a statement of the specific occupant is acquired. The acquired statement is then interpreted by the control unit as an expression of interest. In an additional embodiment, the assistance system comprises an identification unit connected to the control unit. The identification unit is used for detecting a specific occupant of the vehicle. Thereby, it becomes possible to associate statements with a specific occupant.

According to the invention, the control unit is moreover configured in such a manner that it associates the acquired statement both with represented marker information and also with the specific occupant and stores this association in the data memory. The configuration of the control unit can be based on configuration parameters entered by the driver or learned. In addition, different configurations can be combined into selectable profiles.

Preferably, the control unit comprises a special learning module for learning the interests of the specific occupant, with an algorithm for machine learning, which can be monitored or semi-monitored. As a result, the assistance system can learn the interests of the specific occupant and generate marker information corresponding to the learned interests.

By a continuous and permanent storing of associations between statements of the specific occupant and marker information, the assistance system can form an interest profile of the specific occupant during operation. The learning module can evaluate the interest profile formed in order to predict an interest of the specific occupant for new marker information. A predicted interest can be confirmed, modified or rejected by the specific occupant, in order to accelerate the learning of the assistance system and further improve it.

The statements necessary for forming the interest profile can be communicated to the assistance system by the specific occupant in accordance with a corresponding request of the assistance system or unrequested during a trip or in a special training mode. In the process, unrequested statements are associated with individual images or image sequences of the video stream.

Based on the video stream, the control unit can estimate distances to detected identities. According to an additional embodiment, the assistance system comprises an additional sensor, in particular a radar sensor, which makes data on distance to detected entities available to the control unit.

In an embodiment of the assistance system, marker information comprises a contour of a detected entity, a request to the specific occupant for a statement concerning a detected entity and/or a highlighting of an entity detected as of interest to the specific occupant and/or additional information. In other words, the assistance system can mark in a position-accurate manner a detected entity based on its two-dimensional contour within the video stream. The marking can be designed by a corresponding graphic representation and/or supplementation with an intuitive symbol such as, for example, question mark, in such a manner that it is understood by the specific occupant to be a request for a statement on his/her interest in the marked entity. Alternatively or additionally, the marking can also be designed by a corresponding graphic representation and/or supplementation with an intuitive symbol, such as, for example, an exclamation point, in such a manner that the attention of the specific occupant is guided to the entity marked as of interest. In addition, the marker can comprise one or more additional information items, which the control unit loads from a list and/or database stored in the vehicle or downloaded on line from an external server. Such additional information can be of factual and/or commercial type. Additional commercial information also includes advertising displays and/or current offers of vendors in the surrounding area of the vehicle.

In an embodiment, the assistance system comprises a video stream manipulation unit connected to the outside camera and the control unit, for merging the video stream with the marker information in order to form an augmented reality stream (Augmented Reality, AR), and the display unit is connected to the video stream manipulation unit. By means of a video stream manipulation unit, the marker information generated by the control unit can be overlaid in the video stream recorded by the outside camera ("Overlay"), i.e., the video stream manipulation unit makes available a video stream combined from actual individual images of the surrounding area and individual images containing marker information corresponding thereto. Additional functions of the video stream manipulation unit can be zooming in ("Zooming-In"), duplicating ("Duplicating") or other manipulations of sections of the video stream with detected entities of interest.

In an additional embodiment, alternatively or additionally, in the assistance system, the display unit is designed as a monitor, in particular as a liquid crystal display (Liquid Crystal Display, LCD) and makes the augmented reality stream visible to the specific occupant. Monitors are proven and widely distributed display units for digitized information. However, existing or future alternative display units are also covered by the scope of protection of the present invention.

In an embodiment of the assistance system, the display unit is integrated in a glass pane, in particular the windshield pane (Head-Up Display, HUD) of the vehicle and is actuated by the control unit in such a manner that the represented marker information relative to the image perspective of the specific occupant corresponds to the entities visible through the glass pane. Thus, in the glass pane, only the marker information relative to the viewing angle of the specific vehicle occupant is overlaid in a position-accurate manner, while the surrounding area of the vehicle is optically perceived directly through the glass pane. This variant offers the advantage that the driver does not have to direct his/her gaze away from the glass pane to a monitor arranged next to the glass pane. Naturally, a combination of multiple display units, for example, a combination of a Head-Up-Display and a monitor, is also possible.

In an additional embodiment of the assistance system, the human machine interface is arranged and designed in such a manner that it acquires statements of a driver of the vehicle and/or of a passenger in the vehicle. In currently conventional vehicles, an acquisition of statements of the driver is desirable above all. However, in a highly automated or fully automated self-driving function of the vehicle, there is no longer any essential difference between the driver and the additional occupants of the vehicle. Accordingly, in such vehicles, one or more human machine interfaces as well as display units can be provided, which are associated with any or each occupant separately.

In an embodiment of the assistance system, the human machine interface and/or the identification unit is formed as a button integrated in particular in a steering wheel of the vehicle, as a voice control, as a touch control, as a gesture control and/or as a mimic control and/or as a fingerprint reader. In other words, the human machine interface and the identification unit can be formed as any combination of the mentioned interaction variants. A statement of the specific occupant to express an interest in a correspondingly marked entity can occur, for example, by means of a button, by voice control, by touching a touch-sensitive monitor or by optical acquisition of a gesture or facial expression. For the identification of the specific occupant, a fingerprint reader is particularly suitable, while a gesture control is naturally rather unsuitable. The other variants mentioned as examples can also be considered as identification unit. Naturally, additional existing or future interaction systems which are suitable as human machine interface or as identification unit are not outside the scope of protection of the present invention.

When the human machine interface is formed as an interest button and a no-interest button, for example, on opposite sections of the steering wheel of the vehicle, or in the form of corresponding buttons on a touch contact-sensitive monitor, the specific occupant can differentiate the level of his/her interest or lack of interest in a marked entity by the frequency of depression of a button in rapid succession, i.e., he/she can express normal interest or lack of interest by single depression or intense interest or lack of interest by double depression of the corresponding button.

In an embodiment of the assistance system, the human machine interface is designed in such a manner that it determines viewing direction of the specific occupant. With such a human machine interface, the specific occupant can also express his/her interest in a marked entity, for example, by fixing his/her gaze on the marked entity for a certain minimum duration. Conversely, fixing the gaze on the marked object only briefly up to a certain lower maximum duration is evaluated as a lack of interest in the marked entity. The determined viewing direction of the specific occupant can furthermore be used—in connection with geographic location information—for calculating the distance of the marked entity from the vehicle.

In an embodiment of the assistance system, the control unit is designed to associate detected entities with geographic location information. Geographic location information can be transmitted, for example, by a navigation system present in the vehicle, to the assistance system. Alternatively, the assistance system can also download geographic location information directly from a satellite receiver (GPS). A coupling of the assistance system to a navigation system built into the vehicle moreover offers the advantage that marked entities can be identified based on the data contained in the digital maps, so that the marker information can comprise corresponding names and/or designations of the entities. In addition, the navigation system can provide information on the travel route and/or on the orientation of the vehicle, to the assistance system, information which can further enrich and improve the generated marker information and also enable a calculation of the distance to the marked entities.

In an embodiment, the assistance system comprises a plurality of display units and/or a plurality of outside cameras, which, relative to the vehicle, are oriented forward and in particular additionally to the right, to the left and/or rearward. With a plurality of display units, multiple specific occupants of the vehicle can each receive individual marker information displayed. By a plurality of outside cameras, alternatively or additionally, multiple different viewing directions can be simulated, so that different specific occupants, depending on the glass pane through which they are looking into the surrounding area, receive different marker information displayed.

Furthermore, the present invention relates to a method for guiding an attention of a specific occupant of a vehicle. Here, the vehicle comprises at least an outside camera for generating a video stream generating a surrounding area of the vehicle,
  a control unit connected to the outside camera, for detecting entities, in particular persons, objects, landscapes and/or traffic situations, in the video stream, and for generating marker information corresponding to individual images and/or image sequences of the video stream and/or to the entities detected in the video stream,
  a display unit connected to the control unit, for the graphic representation of the marker information generated by the control unit,
  an identification unit connected to the control unit, for detecting a specific occupant of the vehicle,
  a human machine interface (Human Machine Interface, HMI) connected to the control unit, for acquiring a statement of the specific occupant, and
  a data memory for storing acquired statements.

In the method according to the invention, a statement of an occupant is acquired by the human machine interface, the acquired statement is associated by the control unit with a specific occupant and represented marker information, and the association is stored in the data memory.

In a possible embodiment, a contour of a detected entity, a request to the specific occupant for a statement on a detected entity, highlighting of a detected entity as of interest to the specific occupant and/or additional information on detected information is/are used as marker information.

In an additional embodiment of the method according to the invention, the video stream and the marker information are merged by a video stream manipulation unit of the vehicle which is connected to the outside camera, the control unit and the display unit, to form an augmented reality stream (Augmented Reality, AR).

In yet another embodiment, a monitor, in particular a liquid crystal display (Liquid Crystal Display, LCD) is used as display unit, in order to make the augmented reality stream visible to the specific occupant.

Furthermore, according to an additional embodiment of the method according to the invention, a display unit integrated in a glass pane of the vehicle, in particular in the windshield pane (Head-Up Display, HUD), is used and is actuated by the control unit in such a manner that the represented marker information, relative to the viewing perspective of the specific occupant, corresponds to the entities visible through the glass pane.

Furthermore, according to another embodiment of the method according to the invention, statements of a driver of the vehicle and/or of a passenger in the vehicle are acquired by the human machine interface.

It is conceivable that a button integrated, in particular in a steering wheel of the vehicle, a voice control, a touch control, a gesture control, a mimic control and/or a fingerprint reader is/are used as human machine interface and/or as identification unit.

According to yet another embodiment of the method according to the invention, a viewing direction of the specific occupant is determined by the human machine interface.

Furthermore, according to the invention, it is possible that detected entities are associated by the control unit with geographic position information.

According to yet another embodiment of the method according to the invention, a plurality of display units of the vehicle and/or a plurality of outside cameras of the vehicle is/are used, which, relative to the vehicle, are oriented forward and in particular additionally to the right, to the left and/or rearward.

BRIEF DESCRIPTION OF THE DRAWINGS

The invention is represented diagrammatically in the drawing based on an embodiment and is further described in reference to the drawing. In the drawing:

FIG. 1 shows an embodiment of the assistance system according to the invention, in a diagrammatic block diagram.

FIG. 1 shows, in a diagrammatic block diagram, an embodiment of the assistance system according to the invention for a vehicle which is not represented. The vehicle is provided with a highly automated (stage 3) or fully automated (stage 4) self-driving functionality. However, an assistance system according to the invention can also be installed in a vehicle without self-driving functionality or with low self-driving functionality.

DETAILED DESCRIPTION

Below, only by way of example, it is assumed, in a nonlimiting manner, that the assistance system according to the invention assists the driver of the vehicle. Alternatively or additionally, the assistance system can assist each additional specific occupant of the vehicle, that is to say the front passenger or other passengers in the vehicle, including multiple occupants at the same time.

The assistance system comprises a plurality of outside cameras 10, 11, 12, of which only three are represented for the sake of clarity. One of the outside cameras 10, 11, 12 is arranged and oriented in such a manner that, relative to the vehicle, it acquires a front surrounding area. Additional outside cameras 10, 11, 12 are provided for acquiring a left, a right and/or a rear surrounding area of the vehicle.

Furthermore, the assistance system comprises a central control unit 20 to which the outside cameras 10, 11, 12 are connected. For this purpose, the outside cameras 10, 11, 12 are connected to corresponding interfaces 21, 22, 23 of the control unit 20.

In addition, the assistance system comprises a video stream manipulation unit 50 to which the outside cameras 10, 11, 12 are also connected. For this purpose, the outside cameras 10, 11, 12 are connected to corresponding interfaces 51, 52, 53 of the video stream manipulation unit 50. The video stream manipulation unit 50 is moreover connected to the control unit 20 via corresponding interfaces 26, 54 of the control unit 20 or of the video stream manipulation unit 50.

The assistance system moreover comprises two display units 60, 61 which are connected to the video stream manipulation unit 50. For this purpose, the display units 60, 61 are connected to interfaces 55, 56 of the video stream manipulation unit 50. One display unit 60 is designed as a head-up display, while the other display unit 61 is formed as LCD monitor.

The assistance system comprises an identification unit 30 which is connected to the control unit 20 via an interface 24 of the control unit 20, and a human machine interface 40 (Human Machine Interface, HMI) which is connected to an interface 25 of the control unit 20.

The control unit 20 moreover comprises a data memory interface 27 to which a data memory 70 of the assistance system is connected, as well as a navigation system interface 28 to which a navigation system 80 of the vehicle is connected. Alternatively, a satellite receiver (for example, GPS) can also be connected to the navigation system interface 28.

In a vehicle with highly or fully automated self-driving functionality, outside cameras 10, 11, 12, a central control unit 20, an identification unit 30, a human machine interface 40, a video stream manipulation unit 50, display units 60, 61 and/or a data memory 70 can already be installed for implementing the self-driving functionality. In this case, for the assistance system according to the invention, optionally only missing components need to be provided additionally. If all the components necessary for the assistance system according to the invention are already present in the vehicle and connected to one another in the described manner, it can be sufficient to install additional software modules in the control unit 20 in order to produce an assistance system according to the invention.

During the operation of the assistance system, each outside camera 10, 11, 12 acquires a specific surrounding area of the vehicle and generates a video stream reproducing the respective surrounding area of the vehicle.

By means of special software modules, the control unit 20 analyzes the video streams generated by the outside cameras 10, 11, 12 and detects therein certain entities such as, for example, persons, objects, landscapes and/or traffic situations. The control unit 20 generates marker information corresponding to entities detected in the video stream, but also, in the case of a corresponding configuration, to certain individual images and image sequences of the video stream.

The marker information comprises contours of entities detected in the video streams, marker information which is designed as a request to a specific occupant for a statement on the respective entity or as a highlighting of the respective entity as of interest to the specific occupant. The marker information also comprises names and designations of the detected entities. They are determined by associating geographic location information and digital map information, which are transmitted by the navigation system 80 to the control unit 20. Moreover, the marker information comprises additional information on the detected entities. In each case, the control unit 20 loads the additional information from a list or database which is arranged on a central server but which can also be stored in the vehicle. The additional information is of both factual and commercial type. Additional commercial information also includes advertising displays and current offers of vendors in the surrounding area of the vehicle.

In the video stream manipulation unit 50, the video streams of the outside cameras 10, 11, 12 are merged with the marker information of the control unit 20 to form augmented reality streams (Augmented Reality, AR). Such augmented reality streams are made visible on the LCD monitor 61. In addition, the marker information generated by the control unit 20 is graphically represented on a head-up display 60 integrated in a glass pane of the vehicle. In the head-up display (HUD) 60, the represented marker information, relative to the viewing perspective of the driver, corresponds to the entities visible through the glass pane.

In the present case, the identification unit 30 is provided as a mimic control. By means of an interior camera of the vehicle, not represented, which is directed at the face of the driver, a facial expression of the driver is acquired, in order to recognize the driver based on his/her face. Less expensive, but slightly more inconvenient for the driver, is the recognition by means of a fingerprint reader which can be provided alternatively or additionally to the mimic control.

The statements of the driver are acquired by the human machine unit 40. For this purpose, the human machine interface 40 is designed as a gesture control and comprises an interior camera of the vehicle, not represented, which is directed, for example, at the upper body of the driver, in such a manner that it can record in particular hand movements of the driver.

In addition, starting with the image sequences recorded by the interior camera, the viewing direction of the driver is determined. When the gaze of the driver remains for more than a certain minimum duration on an entity, this expression is interpreted as an expression of interest. However, if the gaze merely transiently grazes an entity and remains on it for less than a certain maximum duration which is less than the aforementioned minimum duration, this expression is interpreted as an expression of lack of interest.

Additionally or alternatively to the gesture control, a button can be provided, which is arranged on the steering wheel. Without removing the hand from the steering wheel, the driver can thus express his/her interest in sequences or marked entities of the video stream in a differentiated manner by single or double depression in rapid sequence.

The control unit 20 is configured in such a manner that it associates the detected statements with the driver as well as with an individual image, an image sequence or represented marker information, and this association is stored in the data memory 70. In this manner, the assistance system gradually learns the interests of the driver and can generate the marker information for the video streams in accordance with the interest, i.e., it can highlight entities of interest to the driver by a marker or it can generate no marker or an inconspicuous marker for entities that are not of interest to the driver. Here, the learning process can occur while the vehicle is moving in real time or in a special training mode of the assistance system. For example, for training purposes, during the parking of the vehicle, sections of video streams recorded during previous trips can be reproduced and provided by the driver with corresponding statements.

The assistance system according to the invention offers the advantage of guiding the attention of a specific occupant of a vehicle, in accordance with his/her interests, individually to entities outside of the vehicle. Starting with the entities of interest to the specific occupant, the occupant can later also be given additional information on the entities of interest or be offered services matching the entities of interest. That said, learned interests of a specific occupant can also be shared with other occupants in the same vehicle or else in other vehicles. In addition—after anonymization—commercial activity is conceivable with such interest profiles. Not lastly, in highly automated or fully automated self-driving vehicles, only an additional software module should be necessary, since the components necessary for the assistance system according to the invention are already present in the self-driving vehicle and a multiple use is possible without difficulty.

The invention claimed is:

1. An assistance system for a vehicle, comprising:
an outside camera which is configured to generate a video stream reproducing a surrounding area of the vehicle;
a control unit connected to the outside camera, which is configured to detect entities, in particular persons, objects, landscapes and/or traffic situations, in the video stream, and to generate marker information corresponding to individual images and/or image sequences of the video stream and/or to the entities detected in the video stream;
a display unit connected to the control unit, which is configured to graphically represent the marker information generated by the control unit;
an identification unit connected to the control unit, which is configured to detect a specific occupant of the vehicle;
a human machine interface connected to the control unit, which is configured to acquire a statement of the specific occupant, including a determination of a viewing direction of the specific occupant wherein a minimum duration of viewing, by the specific occupant, is required to associate the viewing direction with the marker information as an expression of interest; and
a data memory which is configured to store the acquired statement,
wherein the control unit is configured to associate the acquired statement of the specific occupant and the viewing direction with represented marker information and with the specific occupant and to store this association in the data memory, wherein the data memory is continuously updated in real time.

2. The assistance system according to claim 1, wherein the marker information includes a contour of a detected entity, a request to the specific occupant for a statement on the detected entity and/or a highlighting of an entity detected as of interest to the specific occupant and/or additional information on detected information.

3. The assistance system according to claim 1, further comprising:
a video stream manipulation unit connected to the outside camera and to the control unit, which video stream manipulation unit is configured to merge the video stream with the marker information into an augmented reality stream, and wherein the display unit is connected to the video stream manipulation unit.

4. The assistance system according to claim 3, wherein the display unit is designed as a monitor, in particular as a liquid crystal display, and is configured to make the augmented reality stream visible to the specific occupant.

5. The assistance system according to claim 1, wherein the display unit is integrated in a glass pane of the vehicle, in particular in the windshield pane, and can be actuated by the control unit in such a manner that the represented marker information, relative to a viewing perspective of the specific occupant, corresponds to entities visible through the glass pane.

6. The assistance system according to claim 1, wherein the human machine interface is arranged and designed to acquire statements of a driver of the vehicle and/or of a passenger in the vehicle.

7. The assistance system according to claim 1, wherein the human machine interface and/or the identification unit is/are designed as a button, in particular a button integrated in a steering wheel of the vehicle, as a voice control, as a touch control, as a gesture control and/or as a mimic control and/or as a fingerprint reader.

8. The assistance system according to claim 1, further comprising:
a plurality of display units and/or a plurality of outside cameras which, relative to the vehicle, are oriented forward and, in particular additionally to the right, to the left and/or rearward.

9. A method for guiding an attention of a specific occupant of a vehicle comprising:
generating, by an outside camera, a video stream reproducing a surrounding area of the vehicle;
detecting entities, by a control unit connected to the outside camera, in particular, persons, objects, landscapes and/or traffic situations, in the video stream, and for generating marker information corresponding to individual images and/or image sequences of the video stream and/or to the entities detected in the video stream;
graphicly representing, by a display unit connected to the control unit, the marker information generated by the control unit;
detecting, by an identification unit connected to the control unit, a specific occupant of the vehicle;
acquiring, by a human machine interface connected to the control unit, a statement of the specific occupant, including a determination of a viewing direction of the specific occupant, wherein a minimum duration of viewing, by the specific occupant, is required to associate the viewing direction with the marker information as an expression of interest; and
storing acquired statements, by a data memory, wherein a statement of an occupant is acquired by the human machine interface, the acquired statement is associated by the control unit with a specific occupant, with the viewing direction, and with represented marker information, and the association is stored in the data memory, wherein the data memory is continuously updated in real time.

\* \* \* \* \*